United States Patent [19]

Fujita

[11] Patent Number: 5,677,075

[45] Date of Patent: Oct. 14, 1997

[54] ACTIVATED LEAD-ACID BATTERY WITH CARBON SUSPENSION ELECTROLYTE

[76] Inventor: Kenichi Fujita, 1-112-3, Kōonjichō, Kitaku, Nagoyashi, Aichi, Japan

[21] Appl. No.: 535,527

[22] Filed: Sep. 28, 1995

[51] Int. Cl.⁶ ........................................ H01M 6/00
[52] U.S. Cl. ...................... 429/48; 429/49; 429/50; 429/188
[58] Field of Search ................ 429/48, 49, 50, 429/188

[56] References Cited

U.S. PATENT DOCUMENTS 3,840,407  10/1974  Yao et al. ........................ 429/42
5,185,221   2/1993  Rampel ........................... 429/101

*Primary Examiner*—Bruce F. Bell
*Attorney, Agent, or Firm*—Koda and Androlia

[57] ABSTRACT

A $PbO_2$ cathode of a lead-acid battery is activated by electrochemical doping with colloidal solution of carbon which is subjected to electrochemical modification endowed with —C—O—O— and C—O— groups on its surface. The battery shows the following advantageous characteristics: (i) high charge current without extraordinary increase in the temperature; (ii) high discharge current; and (iii) the increase in the lifetime of the battery. This process is applicable for the revival of degraded batteries and formation treatment of electrodes of new batteries. Thus, lead-acid batteries of high performance can be obtained.

4 Claims, 9 Drawing Sheets

ACTIVATED LEAD-ACID BATTERY WITH CARBON SUSPENSION ELECTROLYTE

TECHNICAL BACKGROUND OF THE INVENTION

The present invention relates to an electrolyte solution for lead-acid batteries, and lead-acid batteries using the electrolyte solution. More particularly, the invention relates to an electrolyte solution for lead-acid batteries which is useful for improving performance of lead-acid batteries for automobiles and reviving deteriorated lead-acid batteries, or which enables scrapped lead-acid batteries to be reused, and it also relates to lead-acid batteries using such electrolyte solution.

Lead-acid batteries have various disadvantages which are originated from their inherent structures and which cause serious environmental contamination.

At first, the inherent problems of the lead-acid batteries will be described. Conventional lead-acid batteries are ordinarily charged with low currents so that it takes a too long time until charge of the batteries are completed. The weights of the batteries are considerably heavy. Further, there exist few techniques of restoring scrapped lead-acid batteries to be nearly new. An additive to an electrolyte solution which is used at present, is only effective in slightly prolonging the life time of a lead-acid battery deteriorated in performance.

Secondly, the environmental problems will be mentioned. More specifically, lead-acid batteries for automobiles are generally scrapped after use of about three years. When scrapping the lead-acid batteries, they are stacked in open space and exposed in the surrounding environment because disposal or revival of the lead-acid batteries is expensive. Dilute sulfuric acid and lead contained in the scrapped lead-acid batteries are substances to cause pollution. Secondary pollution caused by these substances is serious. Also, large-sized lead-acid batteries used in ships are also thrown in the deep sea. The contamination of the sea by the scrapped lead-acid batteries are now proceeding on a global scale.

The present invention aims to provide lead-acid batteries of large capacity, light weight and long lifetime, and also an electrolyte solution which makes it possible to charge lead-acid batteries with high currents for a short period of time and which remarkably improves performance of lead-acid batteries which may be old or new. The invention further aims to provide an electrolyte solution which can revive scrapped lead-acid batteries.

PRIOR ART

For the purpose of improving performance of lead-acid batteries, carbon powder, metal powder or the like is used as a conductive material of cathode mix in combination with $MnO_2$, $CuO$, $NiOOH$, $PbO_2$, $CF_x$, etc. which are cathode active materials. In connection with carbon powder, there have been filed some patent applications. For example, ① Japanese Patent Unexamined Publication No. 53-10828 discloses a $PbO_2$ electrode coated with carbon powder; ② Japanese Patent Unexamined Publication No. 54-61642 discloses a $PbO_2$ electrode coated with carbon powder similarly to the above patent application ① by applying a carbon suspending solution on the outer surface of the electrode; and ③ Japanese Patent Unexamined Publication No. 57-158955 discloses metallic lead containing carbon fiber.

According to the present invention, a carbon suspending solution or carbon suspension is used to activate cathodes of lead-acid batteries and, however, the present invention is quite different from the aforesaid conventional examples of the patent applications. The conventional examples ① and ② are essentially the same as each other. Carbon coating is formed on a lead grid or a plastic grid and $PbO_2$ litharge is adhered on the coating, in order to improve conductivity between the lead grid electrode (an electrode base material) and the $PbO_2$ litharge electrode agent. In this case, improvement of the conductivity is realized between the electrode base material and only particles in a first layer of the $PbO_2$ litharge surface in contact with the electrode base material. Conductivity between the electrode base material and a number of particles which are not in direct contact with the electrode base material is not specifically improved. Accordingly, the carbon suspension used in the examples ① and ② hardly affects on the overall electrochemical reaction. In the example ③, the carbon fiber is contained in the metallic lead, which contributes to increase in strength and reduction in weight of a cathode base material to some extent. However, the carbon fiber contained in the metallic lead does not contribute to electrochemical reaction such as charge and discharge because the carbon fiber is shielded by the metal.

SUMMARY OF THE INVENTION

According to the present invention, a carbon suspension is used for activation of electrodes of lead-acid batteries. The invention is arranged as follows.

According to a first aspect of the invention, the carbon suspension is of a solution type and obtained by electrolytic oxidation of a carbon positive electrode in water or the like. The carbon suspension is an electrolyte solution which is supplied in lead-acid batteries. The electrolyte solution will activate positive electrodes ($PbO_2$) of the lead-acid batteries by electrochemical doping of the positive electrodes. A characteristic of the electrolyte solution is that the carbon suspension is a suspensoid. Hydrophilic groups such as carbonyl groups, carboxyl groups or hydroxyl groups are chemically modified on the surfaces of carbon colloid particles.

According to a second aspect of the invention, the carbon suspension is used as a kind of reviving and replenishing liquid for lead-acid batteries which are being used, or for scrapped lead-acid batteries which are difficult to revive because of long use, to thereby activate the lead-acid batteries.

According to a third aspect of the invention, when newly producing lead-acid batteries, the carbon suspension is used as a formation liquid of aged cathode litharge, to obtain favorably activated lead-acid batteries.

In a fourth aspect of the invention, electrodes of lead-acid batteries are improved. According to this, a cathode ($PbO_2$) of the lead-acid battery is in contact with a porous carbon sheet. Thus, it is possible to realize activated lead-acid batteries by charging operation only or charging operation under such a condition that the carbon suspension is added. A more preferable result can be obtained when the porous carbon sheet is a carbon fiber fabric.

The activation of the lead-acid batteries is achieved by electrochemical doping of a $PbO_2$ positive electrode agent with carbon in the carbon suspension. This electrochemical doping will be described later.

DETAILED DESCRIPTION OF THE INVENTION

According to the first aspect of the invention, an electrolyte solution for lead-acid batteries of the invention is a carbon suspension obtained by electrolytic oxidation of a carbon positive electrode in water or the like, the electrolyte solution activating $PbO_2$ cathodes of the lead-acid batteries by electrochemical doping.

The carbon material used for the carbon positive electrode may be crystalline or amorphous, natural or artificial; all kinds of carbon materials can be used. These can be used under such a condition that they are sintered or not sintered. Graphite is the most preferable of all.

The electrode can be formed in any shape such as mass, plate, bar, fiber, sheet, felt or the like. Alternatively, the electrode can be formed of carbon in the form of powder. When the powder carbon is used, it is difficult to form the electrode of the carbon powder as it is. It is thus necessary to fill the carbon powder in a mesh-like basket to form the electrode. The carbon powder may be formed into the electrode after being compressed.

In actual, when water is used as an electrolyte solution to electrolytically oxidize carbon, the pH value of the electrolyte solution shifts to 2 to 3 on the side of acidity. Taking the above fact into consideration, it seems that the original form of acid is carboxylic acid. In case of electrolytic oxidation of carbon, when an electrode made of the carbon material is applied with direct current voltage in water and the currents are gradually intensified, carbon powder is deposited like mist around the positive electrode when the current value exceeds a certain value (the voltage value is variable depending on a distance between the electrodes). The deposited powder suspends in the form of colloid in the water. When electrodes are soaked in the carbon suspension and applied with direct current voltage, the deposited carbon powder is adsorbed on a positive electrode. This electrolytically deposited carbon powder is referred to as electrolytic oxidized carbon powder in the present invention. The above treatment is referred to as treatment of electrolytic oxidation.

In the embodiment of the present invention, the current value at which the start of dispersion of carbon powder by the electrolysis is visually realized, is called a threshold current value for convenience. (Strictly speaking, it is supposed that the deposition occurs at a smaller current value in such a manner that it cannot be perceived.) The threshold current value varies depending on an area of the carbon positive electrode, a distance between the positive and negative electrodes, the existence of electrolyte or the amount of the electrolyte. In the case where city water is used as the electrolyte solution, when a distance between the positive and negative electrodes is 3 mm or less and an area of the positive electrode is 200 $cm^2$, the threshold current value is 3 to 5 ampere.

Water is preferable as the electrolyte solution for electrolytic oxidization. Water may be used alone, but if necessary, an acidic component of an electrolyte solution in a battery or another electrolyte such as NACl, LiCl or the like may be added into the water. In case of using pure water as the electrolyte solution, the acidic component of the electrolyte solution or another electrolyte as described above, may be added in to give it conductivity. Water such as city water in which a very small amount of mineral component exists, ensures an appropriate degree of conductivity without adding any substances, so that a desirable carbon powder dispersion liquid can be obtained. The carbon suspension in which electrolytic oxidized powder is dispersed in electrolyte solution is colloidal solution, and is synthesized by electrochemical oxidation. The carbon colloid in the solution acts as a dopant for cathodes in lead-acid batteries. (According to the terminology of electrochemistry, cathodes and anodes are defined as positive and negative electrodes for battery systems, respectively.) The activation of carbon colloid for cathodes results in (1) revival of degraded batteries, (2) large charge-currents without any extraordinary increase in temperature, (3) increase in discharge currents and (4) increase in the life time of batteries. In order to describe the details of this invention, the preparation of the carbon colloidal solution is presented below.

There are many means for the oxidation of carbon. Those are, (1) chemical oxidation by oxidants such as concentrated nitric acid, concentrated sulfuric acid, fuming nitric acid, potassium hypochlorite or potassium permanganate, (2) oxidation with ozone, (3) oxidation by discharge or plasma-discharge and (4) oxidation by electron-beam irradiation. Oxidation (electrolytic oxidation) of carbon by electrochemical means is known at present, but as far as we know, this is not employed in industry. According to one embodiment of the invention, such electrochemical oxidation treatment is applied to carbon in water or the like, so that a stable carbon suspension can be obtained.

We will describe here about the preparation of the carbon suspension. The present procedure to obtain the carbon suspension is electrolysis of water including a small amount of salt such as lithium chloride with an anode (positive electrode) made of pressed and sintered carbon particles and a platinum cathode (negative electrode). The applied voltage between the electrodes is high enough to electrolyze the water. As the electrolysis proceeds, carbon particles become suspending. The electrolysis is continued until the pH value of the solution decreases at 2.5. Carbon particles suspend in the solution without any dispersing agent. The sedimentation of carbon particles is not recognized ten days after the preparation.

The mechanism of the electrochemical oxidation is considered as follows. More specifically, the electrochemical oxidation is initiated with the reaction of the reduction of oxygen.

$$e^- + O_2 \rightarrow O_2^{3-} \tag{1}$$

The source of oxygen is either the one dissolved in the solution or the electrolytic product formed at the anode. Since the reaction (1) is dominant near the cathode, oxygen molecules must drift from the anode to the cathode. The product of the reaction (1), namely, $O_2^-$ turns to be $OH^-$ at the final stage according to the following reaction.

$$O_2 + 2H_2O + 4e^- \rightarrow 4OH^- \tag{2}$$

It is conceivable that $OH^-$ thus formed reacts with anode carbon to give —OH groups on the carbon surface. It is also conceivable that —OH groups turn to be aldehyde (—CHO) and/or carboxyl (—COOH) groups at the second stage of the further oxidation. Fortunately, we have succeeded to obtain some evidences for the existence of those groups on the carbon surface.

Figure 1:
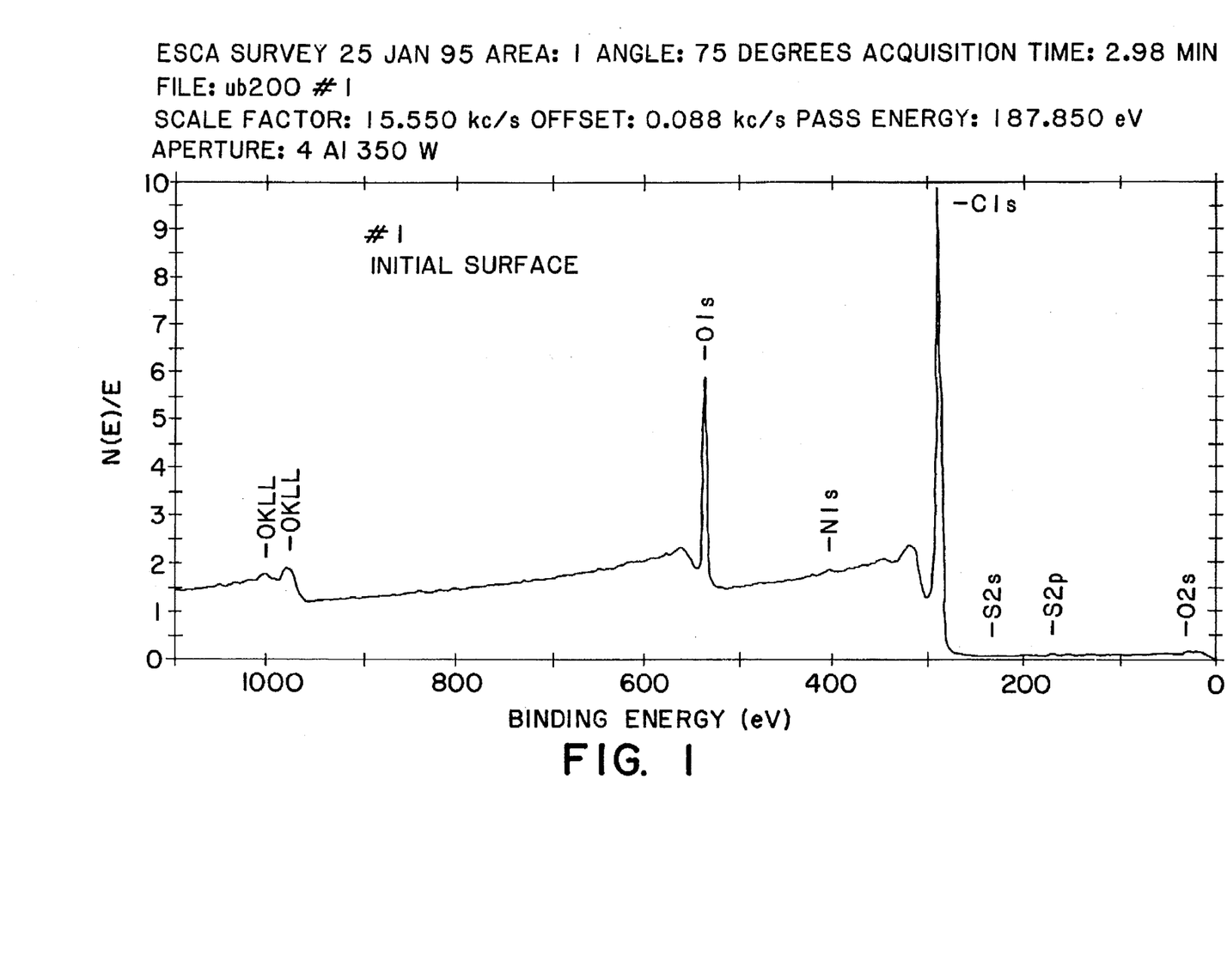
FIG. 1 is a chart of ESCA spectrum of electro-chemically oxidized carbon particles in a carbon suspension according to the present invention.

FIG. 1 shows the ESCA (Electron Spectroscopy for Chemical Analysis) spectrum of the electrochemically oxidized carbon. The measurement was made with X-ray photoelectric emission spectroscope (Physical Electronics Inc., 5600 Ci) using Alk α X-ray source (350 W).

ESCA gives informations of binding energy of electrons of inner shells such as 1s, 2s and 2p by the X-ray irradiation of surface atoms of samples and by measuring the kinetic energies of the ejected electrons. This is a strong weapon for a surface analysis.

Figure 2:
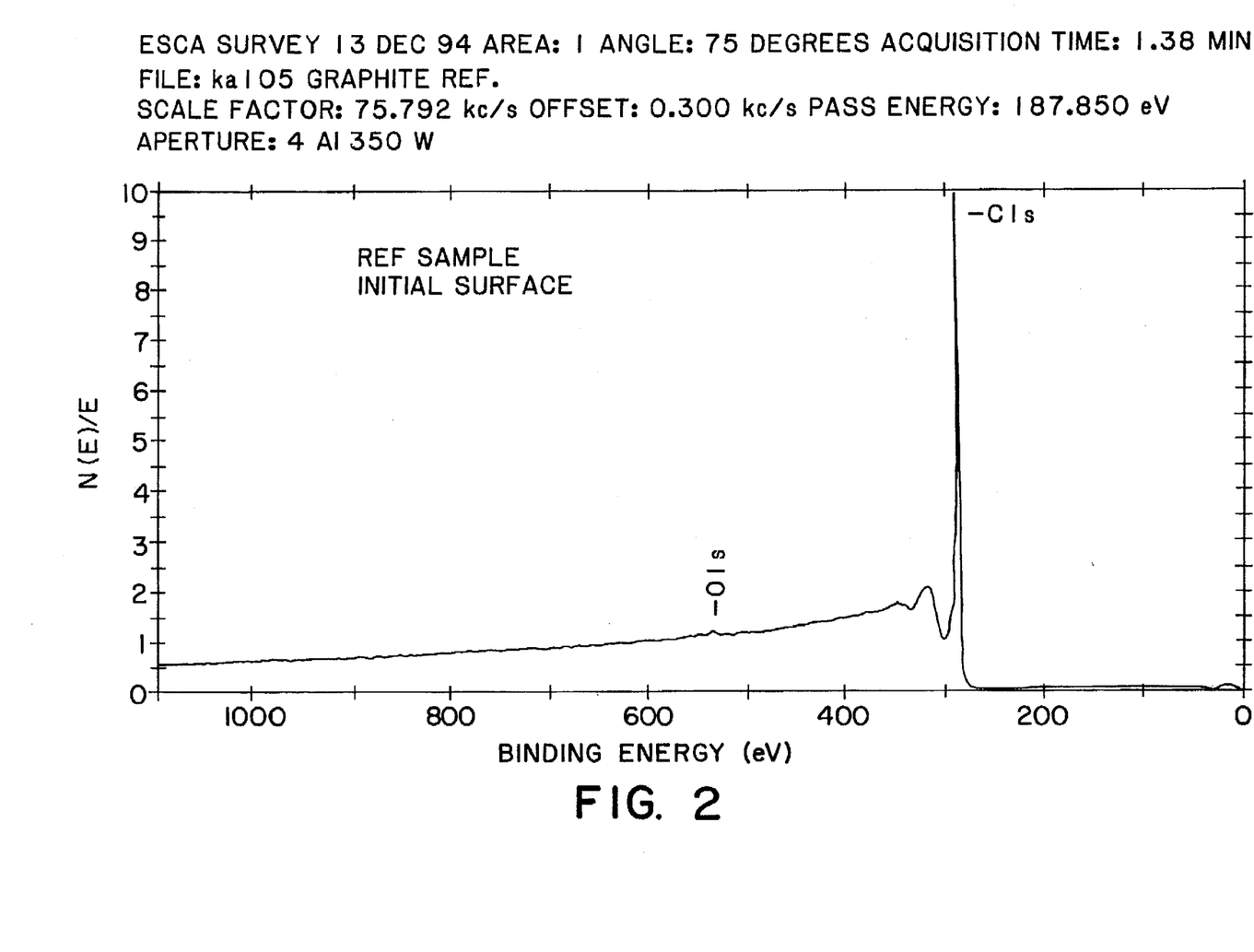
FIG. 2 is a chart of ESCA spectrum of carbon particles which are not subjected to the electrochemical oxidation.
Figure 3:
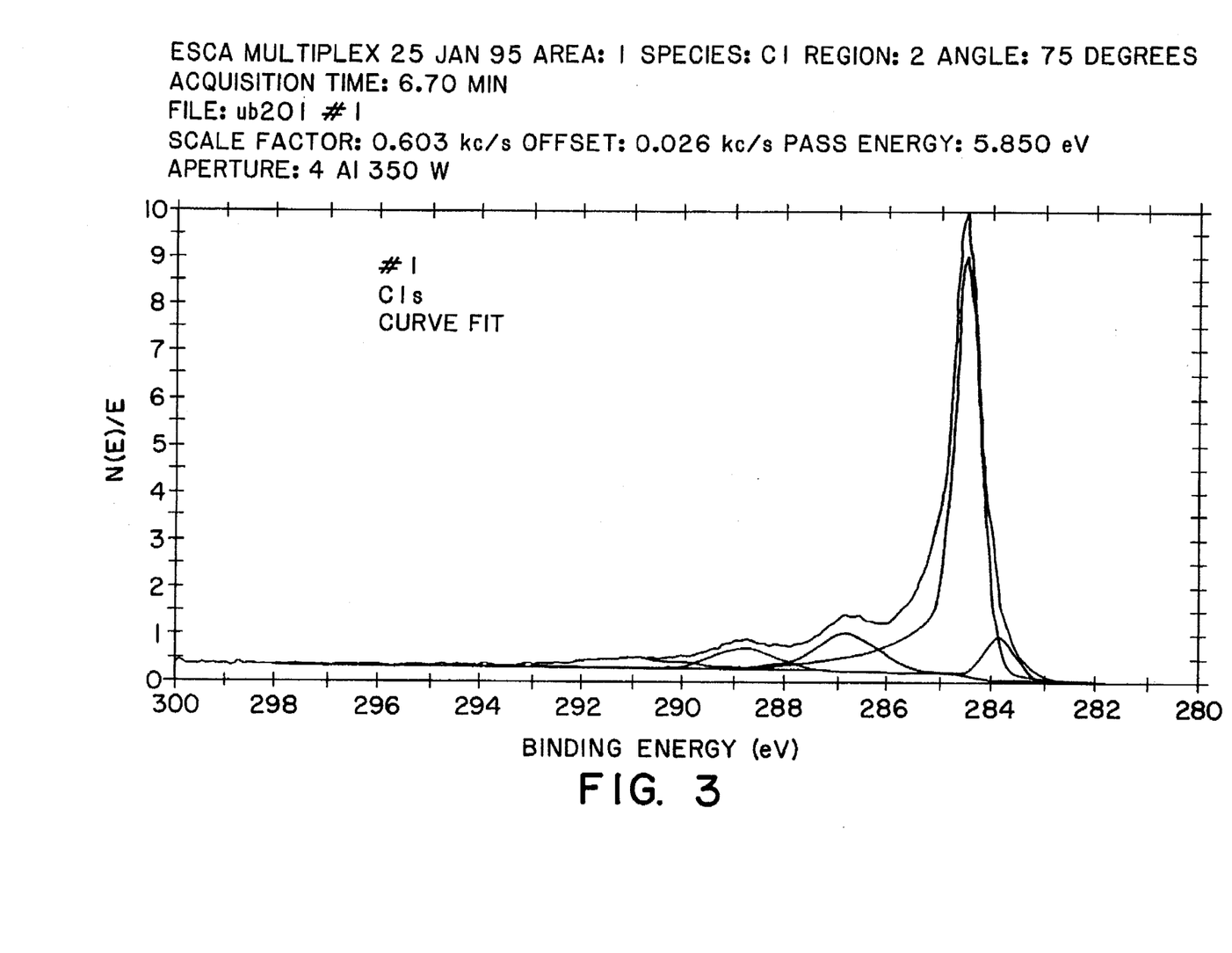
FIG. 3 is a chart of ESCA spectrum of $C_1s$ peak in FIG. 1 expanded over the region from 280 to 300 eV.

It is seen in FIG. 1 that peaks for C and O exist together with a small amount of N and S. It should be noted that ESCA gives information only for surface (one or two atomic layers from the surface) and thus it is very sensitive for surface contamination. N could relate to nitrogen in air and S may be contamination when carbon is electrolytically oxidized. We would conclude from FIG. 1 that the amount of oxygen in the carbon surface is 15.33%. For the comparison, we have measured ESCA spectrum for carbons which were not subjected to the treatment of electrolytic oxidation. The result is shown in FIG. 2. It is obvious that the amount of oxygen is almost negligible. Therefore, it is concluded that carbon particles are oxidized as a result of treatment of electrolytic oxidation. Further information can be obtained from this ESCA spectrum. FIG. 3 shows the spectrum of $C_1s$ peak in FIG. 1 expanded over the region from 280 to 300 eV. The top red curve in FIG. 3 shows the spectrum as obtained. It is obvious that this top curve consists of some component peaks. By a computational work, it is possible to obtain each component as is shown in FIG. 3. The computational work must be done in order that the summation of each component fits to the original(top red) peak. Those component peaks are shown in Table 1.

Table 1. Assignment of the component $C_1s$ peaks of ESCA spectrum taken for carbon particles electrolytically oxidized

| Peak energy (eV) | color | assignment | area (%) |
|---|---|---|---|
| 290.91 | green | satellite peak of $\pi^-\pi^*$ | 5.93 |
| 288.77 | blue | —C—O—O-(carboxyl) | 5.94 |
| 286.78 | violet | —C—O— | 10.49 |
| 285.01 | yellow-green | —CH | 12.43 |
| 284.43 | red | C—C (graphite) | 59.55 |

Figure 4:
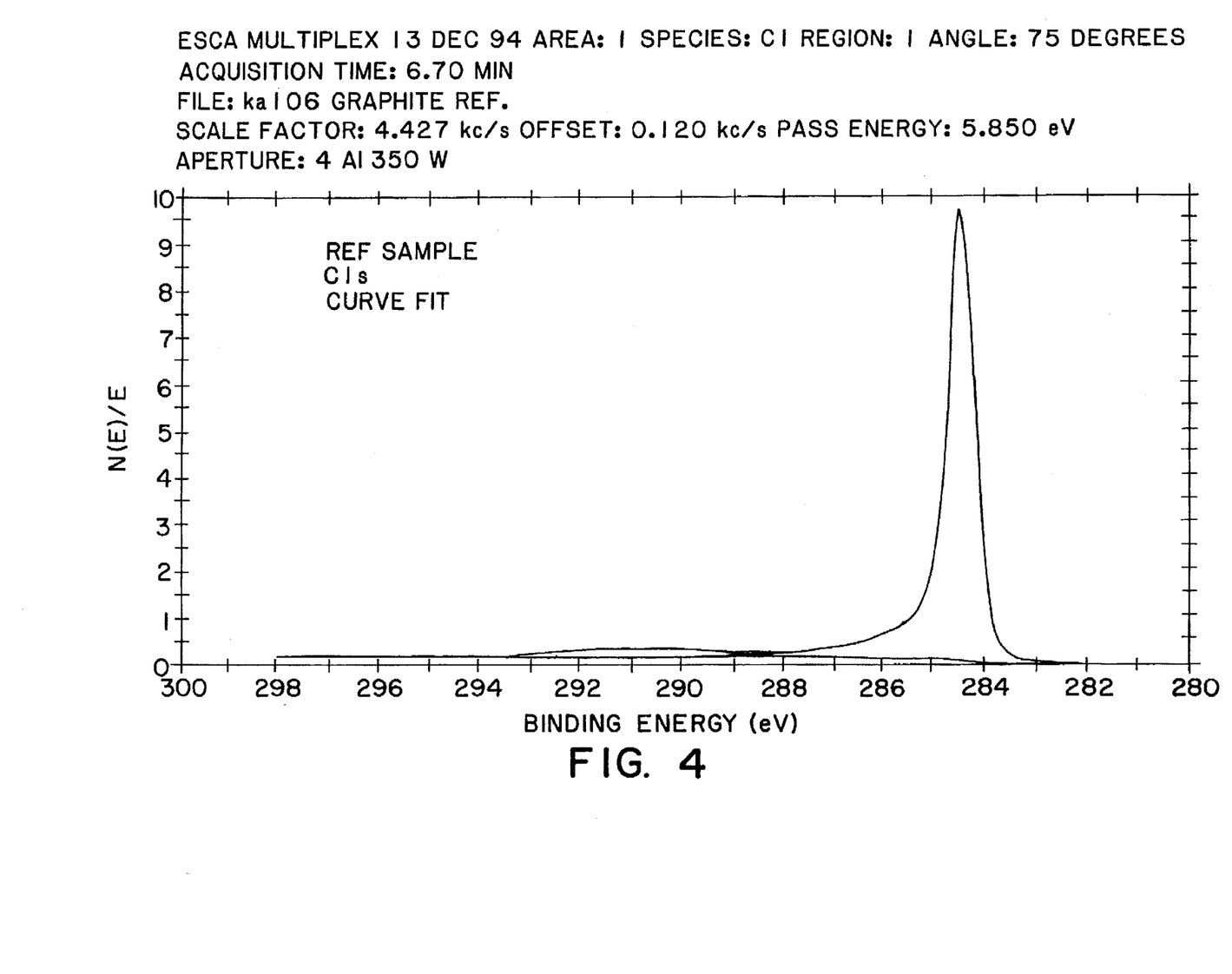
FIG. 4 is a chart of ESCA spectrum of $C_1s$ in FIG. 2.

It is important to note that the existence of carboxyl and —C—O— groups is clearly confirmed. These groups could be speculated to have H atoms in one end, namely, —COOH and —OH. However, further research is necessary to confirm this point. The same procedure was taken for unoxidized particles in FIG. 2. The result is shown in FIG. 4. It should be noted that only two peaks are seen in this case, namely 290.69 eV (satellite peak of $\pi-\pi^*$) and 284.39 eV (graphite) and that neither carbonyl group nor —C—O— group are recognized. As a conclusion, carbon particles in carbon suspension obtained by electrolytic oxidation are endowed with —COOH and —C—O— groups on the surfaces so as to become electrochemically modified carbon particles. Taking into consideration the fact that the neutral aqueous solution turns to be acidic (for example pH=2–3.5) aqueous solution as electrochemically oxidation proceeds, the carbonyl group probably exists as —COOH. It is also probable that —C—O— exists as —C—OH, taking the process of the above-described electrochemical reactions into consideration. These —COOH and —C—OH groups play important roles for the dispersion of the carbon particles and the activation of $PbO^2$ cathodes in lead-acid batteries. Although carbon particles are inherently hydrophobic, the surface of carbon becomes hydrophilic by chemical modification, so that stable suspension can be obtained.

When the carbon is graphite, it is supposed that cleavage may occur in the layer structure of graphite particles when the graphite is electrolytically oxidized. The particles of graphite can be expected to be thinner with proceeding the electrolytic oxidation. This process could also contribute to the dispersion of particles, so that an extremely stable colloidal carbon suspension can be obtained.

According to the second aspect of the invention, the carbon suspension as an electrolyte solution, obtained by the first invention, is added into an originally-used acidic electrolyte solution remaining in the battery, and the battery is charged. As a result, carbon powder is adsorbed on a positive electrode, thereby realizing a lead-acid battery whose function is conspicuously improved.

Meanwhile, powder not oxidized does not suspend in water nor be adsorbed on a positive electrode. If the positive electrode is coated with the non-oxidized powder merely physically, a characteristic of the battery is not improved.

It may be suspected that electric short-circuit between positive and negative electrodes will occur because of suspension of carbon powder in the electrolyte solution. However, we can neglect the short-circuit because the concentration of carbon particles in the electrolyte solution used in the present invention is much lower than the percolation threshold, which will be fully described later. In addition to that when voltage is applied, the carbon powder in the suspension of the invention is absorbed on the positive electrode, which ensures further that we can completely avoid the short-circuit. The suspension turns to be transparent as a result of the adsorption of carbon on the positive electrode.

For the purpose of adsorbing carbon powder on a positive electrode, it is necessary to apply direct current plus voltage to the positive electrode. This application of the voltage corresponds to charge of a battery.

In case of storage batteries for automobiles, since the batteries are continuously charged during running of the automobiles, carbon powder is naturally adsorbed on the positive electrode without performing charging operation. That is to say, in batteries which are used in systems like automobiles including discharging and charging mechanisms integrally incorporated therewith, carbon powder is automatically adsorbed on the positive electrode only by adding a carbon suspension into an electrolyte solution without performing charging operation, thereby improving characteristics of the batteries. On the other hand, in a mechanism in which an electrical charger is not integrally incorporated, it is necessary to perform charging operation prior to use in order to adsorb carbon powder on the positive electrode.

It will be described here how cathodes of lead-acid batteries are activated. One of the characteristic examples of this invention is the revival of a degraded battery. We selected a degraded battery which could not start a motor immediately after charging. Then, an electrolyte solution (dilute sulfuric acid) of the lead-acid battery was partly displaced with the carbon suspension, and subjected to charge. It was confirmed that carbon particles were adsorbed to the cathode as a result of the charge and that the battery could move the engine starter. It should be noted that the degraded battery could store electric power as a result of the treatment with the carbon suspension. However, the power storage was not enough unless a carbon suspension was not added.

The partial displacement of the electrolyte solution with the carbon suspension also enables (1) higher charging current without extraordinary increase in the temperature, (2) higher discharge current and (3) increase in the life time of batteries. The carbon suspension shows these useful functions. At first sight, it may be strange that the carbon colloid particles have such useful functions. However, it can be rationalized in the light of present scientific knowledge as is shown below.

First of all, the mechanism of the structure of carbon colloid must be mentioned. The structure of oxidized carbon is already published. As for carbon colloid by electrochemical processes, this is easily recognized from the observation of a decrease in carbon electrode. However, this has not been employed in industry.

Generally, in order to obtain a carbon suspension, carbon particles are ground in the presence of dispersing agents. No attempt has been made to apply a carbon suspension for the improvement of lead-acid batteries. Carbon suspensions used at present are generally alkaline (alkaline solutions) including dispersing agents. On the contrary, the carbon suspension of the present invention is acidic and no dispersing agents are included. Carbon particles are intrinsically hydrophobic. However, these turn to be hydrophilic as a result of electrolytic oxidation.

It is experimentally true that carbon particles in a carbon suspension are adsorbed on a $PbO_2$ cathode. There is a possibility that some $PbO_2$ particles have not enough electrical connection to the electrode. As is known, $PbO_2$ is a semiconductive material and the cathode consists of an aggregate of $PbO_2$ particles. The carbon particles adsorbed on the surfaces of the $PbO_2$ particles give conductivity to the above-described $PbO_2$ particles which are not otherwise used effectively. Thus, carbon particles act to improve discharge effect.

Another improvement resulting from the adsorption of carbon particles can be expected for $PbSO_4$ which is formed as a result of discharge. $PbSO_4$ is an insulating substance. This turns to be $PbO_2$ as a result of charge. In the charge process, $PbSO_4$ must transfer electrons to the cathode. Therefore, electrical connection to the cathode is inevitable for the $PbSO_4$. Carbon particles adsorbed on the positive electrode agent (which is partially changed to $PbSO_4$), work as electric circuit between $PbSO_4$ and the positive electrode so as to change $PbSO_4$ to $PbO_2$. Thus, in our invention, the $PbO_2$ cathode is activated by adsorbed carbon particles which plays the important role in both cases of charge and discharge.

The carbon particles in the carbon suspension according to the present invention are electrochemically modified to have —COOH and —C—O—H structures. If in a neutral solution, these are immediately dissociated to be —COO$^-$ and —C—O$^-$, which emits their charges at the positive electrode and are connected to the positive electrode. On the other hand, it is considered that —COO$^-$ and —C—O$^-$ are not dissociated in an acidic solution. However, since proton concentration is enough low at a region near the positive electrode to dissociate —COO$^-$ and —C—O$^-$, it is deemed that —COO$^-$ and —C—O$^-$ lose their charges at the positive electrode and are adsorbed on the positive electrode.

The idea to produce conductive particles near a cathode is reported for the battery of $Ag_2$ $WO_4$/$LiClO_4$/Li where conductive Ag particles are produced as a result of discharge, which keeps good contact with electrolyte and cathode.

According to the mechanism for the role of electrochemically modified carbon, it is expected that the application of electrochemically modified carbon reduces the inner resistance of the battery. This is confirmed as is described later in the paragraph concerning an example 10.

Carbon is known as an "active material" in the field of battery. One of the examples is potassium manganese dioxide cells where a cathode active material is a mixture of manganese dioxide and carbon. Carbon in this case is used to increase electrical conduction between manganese dioxide and the cathode. In all cases as far as known at present, carbon materials are preliminarily mixed with active materials when batteries are produced. The interaction between carbon materials and active materials in these cases is simply mechanical contact. Generally, carbon materials are effective for either charge or discharge.

In our present invention, the experimental result clearly demonstrates that electrochemically-modified carbon is effective not only for charge but also for discharge. Our process of the application of electrochemically-modified carbon is not simple mixing. The activation of the $PbO_2$ cathode by electrochemically modified carbon proceeds under electrochemical field in which some chemical reactions including electron transfer are concerned. This process should be regarded as an "electrochemical doing". Thus, this is entirely a new technology in the field of batteries.

"Electrochemical doping" will be defined as follows. At first, we will describe here about doping. The term of doping is generally used in the meaning of administration of drugs in the field of athletics. However, the electrochemical doping is most similar to a term of doping used in the field of semiconductor. Semiconductor is a substance exhibiting a medium extent of conductivity between conductive material and insulating material. A typical example of the semiconductor is well-known silicon semiconductor. Semiconductor made of a pure material is called intrinsic semiconductor. In contrast with the intrinsic semiconductor, semiconductor to which a small amount of impurity such as aluminum, arsenic or the like is added, is called extrinsic semiconductor. In this case, the semiconductor to which aluminum is added, is p-type semiconductor, and the semiconductor to which arsenic is added is n-type semiconductor. This addition of impurity is called doping and the impurity to be added is called a dopant. Contact between the p-type and n-type semiconductors is named p-n junction, which is indispensable for constituting a transistor. This term of doping is also used in the field of conductive macromolecule which is different from the semiconductor such as silicon. A typical example of the conductive macromolecule is polyacetylene. Polyacetylene of cis form is an insulating material and polyacetylene of trans form exhibits improved conductivity which is substantially equivalent to that of semiconductor. It was found that when polyacetylene of trans form was doped with iodine as in the case of silicon semiconductor, the conductivity of polyacetylene was increased by several orders of magnitude. Besides polyacetylene, macromolecule such as polyaniline, polypyrrole, polythiophene or the like exhibits conductivity which is improved by doping. In case of such macromolecule, a macromolecule film can be electrochemically obtained on an electrode by an electrolytic polymerization method. In this case, supporting electrolyte is also doped simultaneously with the polymerization. The dopant doped by an electrochemical method can be removed (this will be referred to as dedoping). A desired dopant can be doped by the electrochemical method. The doping in the latter case is called "electrochemical doping".

As described above, it should be mentioned about the carbon content. If enough amount of carbon particles is added in the electrolyte solution, batteries are short-circuited. The relation between conductivity and carbon content has been discussed and a calculation model, named "percolation model", has been presented. According to this model, the threshold value from which conductivity rises up is about 30 vol. %. When the carbon content is less than the percolation threshold by one order of magnitude, the contribution of carbon to conductivity can definitely be ignored. As seen in an example 6, according to the present invention, when the carbon content is less than 5 wt % or even if it is 0.02 wt %, there is no possibility that the batteries will be short-circuited.

The targets according to the above-described aspects of the invention are already-completed products as batteries which may be new or old, or may be scrapped. The present invention is further applicable to an intermediate process of manufacturing a positive electrode of a battery. Particularly in the formation process, carbon powder can be adsorbed on the electrode.

That is to say, according to a third aspect of the invention, the carbon suspension is used as a formation liquid of aged cathode litharge, to thereby obtain activated lead-acid batteries.

When filling a cathode active material in a positive electrode grid to perform formation treatment, if the above-described carbon suspension or a dilute sulfuric acid solution in which carbon powder suspend, is used as a formation liquid, carbon powder is similarly adsorbed on the positive electrode. When the obtained positive electrode is mounted in the storage battery, there occurs activation the same as the case of the aforesaid completed electrode.

The activation of a $PbO_2$ cathode (electrochemical doping) is effective not only for manufactured lead-acid batteries but also for a $PbO_2$ electrode as a part. The cathode material for lead-acid batteries is originally grains of Pb, PbO packed into a Pb grid. This is a formation process in which Pb or PbO is transformed to $PbO_2$ by electrolysis in a dilute sulfuric acid solution. In this formation process, when employing the electrolytic oxidation method, in other words, the electrochemically modified carbon colloid, both the formation and the activation can be done at the same time. $PbO_2$ doped with the electrochemically-modified carbon particles is obtained in the formation process.

We compared a mixture of $PbO_2$ and normal carbon particles which were not electrochemically modified, with $PbO_2$ activated by electrochemical doping with the carbon suspension of the present invention, and investigated the effect of the mixture of the normal carbon particles and $PbO_2$. However, no battery-performance improving result was obtained from the mixture, as clearly understood from the examples which will be described below.

According to a fourth aspect of the invention, there is provided a lead-acid battery in which the cathode surface is coated with a porous carbon material, and electrolytically oxidized carbon powder is adsorbed on the cathode surface and the surface of the porous carbon material. The porous carbon material used here means a porous sheet having a water permeability, a felt or an aggregate of carbon particles. Concretely, the material may be a porous body such as a woven fabric or nonwoven fabric using carbon fiber, a plate with fine holes bored therein or any other material. However, taking into consideration an area ratio of the holes, flexibility, cost, durability or the like, a sheet or felt using carbon fiber is the most preferable.

As the carbon material, all kinds of carbonaceous materials can be used, which may be crystalline, noncrystal, natural or artificial. These materials can be used under a condition that they are sintered or not sintered.

Normally, a mesh-like separator having a function as an insulator exists between the cathode and anode. In the present invention, a space between the cathode and separator is filled with a sheet or a felt-like or particle-like carbon material to cover the cathode surface.

It is not necessary that one piece of the porous carbonaceous material entirely covers the surface of the cathode. A plurality of pieces of the porous carbonaceous material may be overlapped to cover the cathode surface.

The sheet, felt or carbon particles contact with the cathode active material surface to press down the cathode active material, thereby preventing the material from falling off. At the same time, because the sheet, felt or carbon particles are electrically conducted with the cathode, it becomes equipotential with the cathode. Charging ability is improved by coating the cathode surface with the porous carbonaceous material. Even if the number of electrode plates of a conventional battery is reduced from a combination of two cathodes and three anodes to a combination of one cathode and two anodes, about twice-larger charging capacity is obtained. Thus, weight reduction of lead-acid batteries can be achieved.

The present invention will be described in more detail with reference to the examples.

EXAMPLE 1

(Production method 1 of carbon suspension), Example of crystalline carbon, Bar-like electrode:

Water (pH: 7) was used as an electrolyte solution. An negative electrode was made by bending a mesh plate of stainless steel in a cylindrical shape to have a diameter of 100 mm. A positive electrode of a graphite bar having a diameter of 20 mm and a length of 100 mm, was inserted in the cylindrical negative electrode. Direct currents of 3A were supplied for twenty four hours to produce a colloidal carbon suspension.

Although this carbon suspension was left for ten days, no sedimentation of powder occurred and carbon powder was dispersed in the suspension as carbon colloid. The concentration of the carbon powder in the suspension was 3.1 wt %. The pH value of the electrolyte solution was changed to 2.5.
(Surface analysis of carbon):

As described above, atoms existing on the surface of electrolytically oxidized carbon were analyzed by ESCA. FIG. 1 is a chart of a result of the ESCA analysis of the electrolytically oxidized carbon, and FIG. 2 is a chart of a result of the ESCA analysis of carbon which was not subjected to electrolytic oxidation.

C (peak of $C_1s$), O(peaks of $O_1s$, $O_2s$) and small amounts of N (peak of $N_1s$) and S(peaks of $S_2s$, $S_2p$) existed on the surface of the carbon electrode.

Oxygen: 15.33%
Nitrogen: 0.18%
Carbon: 84.39%
Sulfur: 0.10%

It can be recognized that the carbon surface is chemically modified with oxygen by the electrolytic oxidation. Additionally, in FIG. 2 concerning the carbon not electrolytically oxidized, there exists only a trace of peak of $O_1s$.
(Form of existence of oxygen):

As a result of investigation of the existence form of oxygen on the carbon surface by ESCA, the following peaks ①, ② were recognized.

| ① —C—O— | (286.78 eV) | 8.40% |
|---|---|---|
| ② —C—O—O-(carboxyl) | (288.77 eV) | 9.98% |

It is conceivable that hydrogen is connected to the right sides of ① and ②. Supposedly, the existence of —OH contributes to conversion of the carbon surface to have hydrophilic property and suspension of the carbon. It is thought that the pH value of the electrolyte solution was changed to 2 to 3 due to existence of, in particular, ② of carboxyl groups. (Production method 2 of carbon suspension), Example of crystalline carbon, Felt electrode:

A felt of graphite fiber having a length of 100 mm, a width of 100 mm and a thickness of 10 mm, was used as a positive electrode. Mesh plates (negative electrodes) of stainless steel were disposed on both sides of the positive electrode at intervals of 2 mm.

At this time, in order that the positive and negative electrodes might not be short-circuited and also that the intervals between the positive electrode and the negative electrodes might be kept constantly, resin mesh sheets with a thickness of 2 mm were interposed between the positive electrode and the negative electrodes. City water was used as an electrolyte solution. Direct currents of 3A were supplied for twenty four hours. The concentration of suspending carbon powder was 4.8 wt %. The pH value of the electrolyte solution was 2. (Production method 3 of carbon suspension), Example of noncrystal carbon, Powder electrode:

A cylindrical mesh (325# under) filter of stainless steel having a bottom, the diameter and length of which filter were 20 mm and 100 mm, respectively, was used as a positive electrode. Noncrystal carbon powder whose average diameter was 1 mm was filled in the filter. A stainless plate of 50 mm×100 mm was used as a negative electrode. These positive and negative electrodes were soaked in city water filled in a beaker. Direct currents of 3A were supplied for thirty hours. Thus, a colloidal carbon suspension of noncrystal carbon powder was produced.

Although this carbon suspension was left for ten days similarly to the embodiment 1, there occurred no sedimentation of the powder. The concentration of the carbon powder was 5.5 wt %. The pH value of the electrolyte solution was 2. As for dispersion ability, 99.3% of the carbon powder was dispersed after twenty four hours.

Dispersion stability (%) =

{sample concentration (wt %) after 24 hours/ sample concentration (wt %) after 0 hours} × 100

The value was obtained by the above-described formula.

EXAMPLE 2

(Revival of degraded battery):

An electrolyte solution was extracted from a battery (model GX80D26) for an automobile which could not be used. The inside of the battery was washed with water. Then, the colloidal solution of carbon powder obtained by the production method 1 of the example 1 was fed in the battery. Direct current plus voltage of 15 V was applied to a positive electrode for twelve hours. The positive electrode was coated with the carbon powder. Then, the carbon suspension was extracted from the battery. The electrolyte solution which had previously been extracted, was returned into the battery again. Thereafter, the battery was charged with currents of 15 V and 3A for 24 hours. The voltage before the charge was 9 V. The specific gravity of the battery liquid was 1.18. The voltage was restored to 14 V after the charge, and the engine could be started. After the battery was left for ten days, a trial was made to start the engine. The engine could similarly be started. Thereafter, the above procedures were repeated. Even after six months passed, no change was seen in performance of the battery. In addition, in case of a disused battery whose positive electrode was not coated with carbon powder, the specific gravity of the battery liquid was only changed to 1.20 after charge, but the engine could not be started.

EXAMPLE 3

(Revival of degraded battery):

Battery liquids of disused lead-acid batteries (model GX80D26) were replaced with the carbon suspensions obtained by the production method 2 of the example 1 by 3 vol. %, 5 vol. %, 10 vol. %, 30 vol. %, 50 vol. %, 70 vol. % and 90 vol. %, respectively. The batteries were charged with currents of 14 V and 3A for twenty four hours. After the charge, an engine starting test was carried out. The engine could be started by any battery. After the batteries were left for ten days, a trial was made to start the engines. The engines could be started similarly. Thereafter, the above procedures were repeated for six months. Even then, no change of performance was seen in any battery.

EXAMPLE 4

(Revival of degraded battery):

The carbon suspension obtained by the production method 3 of the example 1 was added in a disused lead-acid battery (model 38B20R) by 50 cc per one cell (the total amount of electrolyte solution per one cell is 416 cc), and the battery was charged with currents of 14 V and 3A for twelve hours. The specific gravity of the battery liquid before the charge was 1.10. After the charge, the voltage was returned to 14 V and the specific gravity was restored to 1.26, and the engine could be started. Then, the battery was left for ten days. A trial was made to start the engine again. The engine could be started similarly. Thereafter, these procedures were repeated for six months. No change of performance was seen in the battery. Additionally, in a battery (disused) in which no carbon colloidal solution was added, the specific gravity of the battery liquid was 1.120 and unchanged after the charge. The engine could not be started with the battery.

EXAMPLE 5

(Revival of degraded battery):

A trial was made to quickly charge a disused lead-acid battery GS(trademark) (model 38B20L) for a compact or medium-sized car, where battery was manufactured by Japan Storage Battery Co., LTD. Before the charge, the battery was replenished with a normal electrolyte solution. The voltage was 5 V and the specific gravity was 1.110. With respect to such battery, the quick charge was performed with currents of 15 V and 10A although ordinary charge should be performed with currents of 14 V and 3.8A. However, only the temperature of the solution was increased and electrolysis did not proceed, so that the battery could not be charged.

Next, the carbon colloidal solution obtained by the production method 1 of the example 1 was added into the battery by 21 to 30 cc per each cell (a total amount of the electrolyte solution per one cell was 416 cc), and the above-described voltage was applied to the battery. Then, the electrolysis was started. Further, even when the voltage was increased and currents of 20A were supplied, the temperature of the solution was not heightened and the battery could be charged smoothly. When the engine was started after two hours, it could operate satisfactorily. After operating for three hours, the specific gravity of the battery electrolyte solution was measured. The specific gravity was 1.20 which was lower than the standard value of 1.250, but it did not adversely affect discharge of the battery. Although it ordinarily takes about five to ten hours until the charge of a battery is completed, in this embodiment, the charge was completed in only two hours. The same test was performed with respect to a HITACHI (trademark) lead-acid battery (model 46B25L) and a YUASA (trademark) lead-acid battery (model 55B24L). It was perceived that the batteries was almost 100% recovered. Then, after the batteries were left for four months, their electromotive forces remained unchanged. Essentially, when batteries are left for four months, spontaneous discharge occurs in the batteries but the above batteries could be used without any troubles.

EXAMPLE 6

(Revival of degraded battery):

An electrolyte solution of a disused lead-acid battery of model GS38(trademark) was extracted, and the following electrolyte solutions were individually supplied into the battery. The concentrations of sulfuric acid in the electrolyte solutions were equivalent to one another, and the amounts of suspending carbon power in the respective solutions are as follows.

Carbon Concentration (wt %)

(1) 0.02, (2) 0.1, (3) 1.0, (4) 3.0, (5) 5.0

The preparation of the carbon concentration was performed by concentrating or diluting the carbon colloidal solution obtained by the production method 2 of the example 1. The battery was charged with currents of 15 V and 2A for two hours without difficulties. Then, the battery was incorporated in an automobile so as to start the engine. The engine could be started satisfactorily. The automobile was run for sixty days for two hours per one day, the total number of hours of running coming to 120 hours. At that time, the automobile could operate without any troubles.

EXAMPLE 7

(Revival of degraded battery):

A degraded battery (GS28) for a light car (having an engine cubic capacity of 550 cc) was revived and tried to use in an automobile of a class having an engine cubic capacity of 2000 cc. About 10% of the electrolyte solution was replaced with the carbon suspension obtained by the production method 2 of the example 1, and then the battery was charged with currents of 20A for one hour. The engine of 2000 cc could be started in a normal state. It was proved that the engine of the 2000 cc class automobile could be started by the battery for a light car. This suggested a possibility that the battery could be reduced in size when the carbon suspension was used as the electrolyte solution.

EXAMPLE 8

(Revival of battery of imported car):

In a battery mounted in a car manufactured by MERCEDES BENZ (trademark) which was conveyed from German on a ship and landed in Japan, completely deep discharge was proceeded under the influence of ambient air temperature when the ship passed the equator during transportation, so that the battery could not be used nor charged. A trial was made to revive the battery which could not be used because of the deep discharge. A total amount of 250 cc of a carbon suspension was supplied in each cell of a battery (almost 100 AH) of a 4.5 liter displacement engine of the car manufactured by MERCEDES BENZ which battery could not be charged. The battery was charged with currents of 60A for 15 minutes. When the battery was mounted in the car manufactured by MERCEDES BENZ and the engine was tried to be started, the engine could be started at once. It became clear from the above that the carbon suspension could recover a battery which deeply discharged, by quick charge for a short period of time.

EXAMPLE 9

(Change of temperature of electrolyte solution):

A change of temperature of the solution during quick charge was examined.

Brand name of the battery: GS(trademark) 6N4-2A

The battery including a conventional dilute sulfuric acid solution was charged for one hour with currents of 4A which was ten times larger than the normal case. The temperature of the solution after the charge was 64° C. Then, 50% of the electrolyte solution was extracted and the carbon suspension manufactured by the production method 1 of the example 1 was filled, and the battery was similarly charged with currents (4A) which were similarly ten times larger than the normal case. The temperature of the solution after the charge was 47° C. In addition, the temperature of the solution was 45° to 50° C. when a conventional battery including a dilute sulfuric acid solution was charged under regular conditions (0.4A×ten hours). It was accordingly proved that the battery of the invention could be a match for the conventional battery charged under the regular conditions.

EXAMPLE 10

(Change of internal resistance):

Brand name of the battery is GS(trademark) 6N4-2A. Internal resistance of a conventional battery using a dilute sulfuric acid solution is 691Ω.

Internal resistance of a battery whose electrolyte solution is replaced by 50 vol. % with the carbon dispersing solution formed by the production method 3 of the example 1, it is 316Ω.

It is deemed that quick charge of the battery of the invention is enabled by a decrease in internal resistance resulting from the supply of the carbon suspension.

EXAMPLE 11

Test of capacity of storage battery (test at normal temperature of 25° C.):

Brand name of the battery: GS(trademark) 6N4-2A

Method of charge: 1A×1 hour

Method of discharge:

The three above batteries were connected to one another in series to turn on head lights of 37.5 W, thus discharging constant currents (1.2A).

Figure 5:
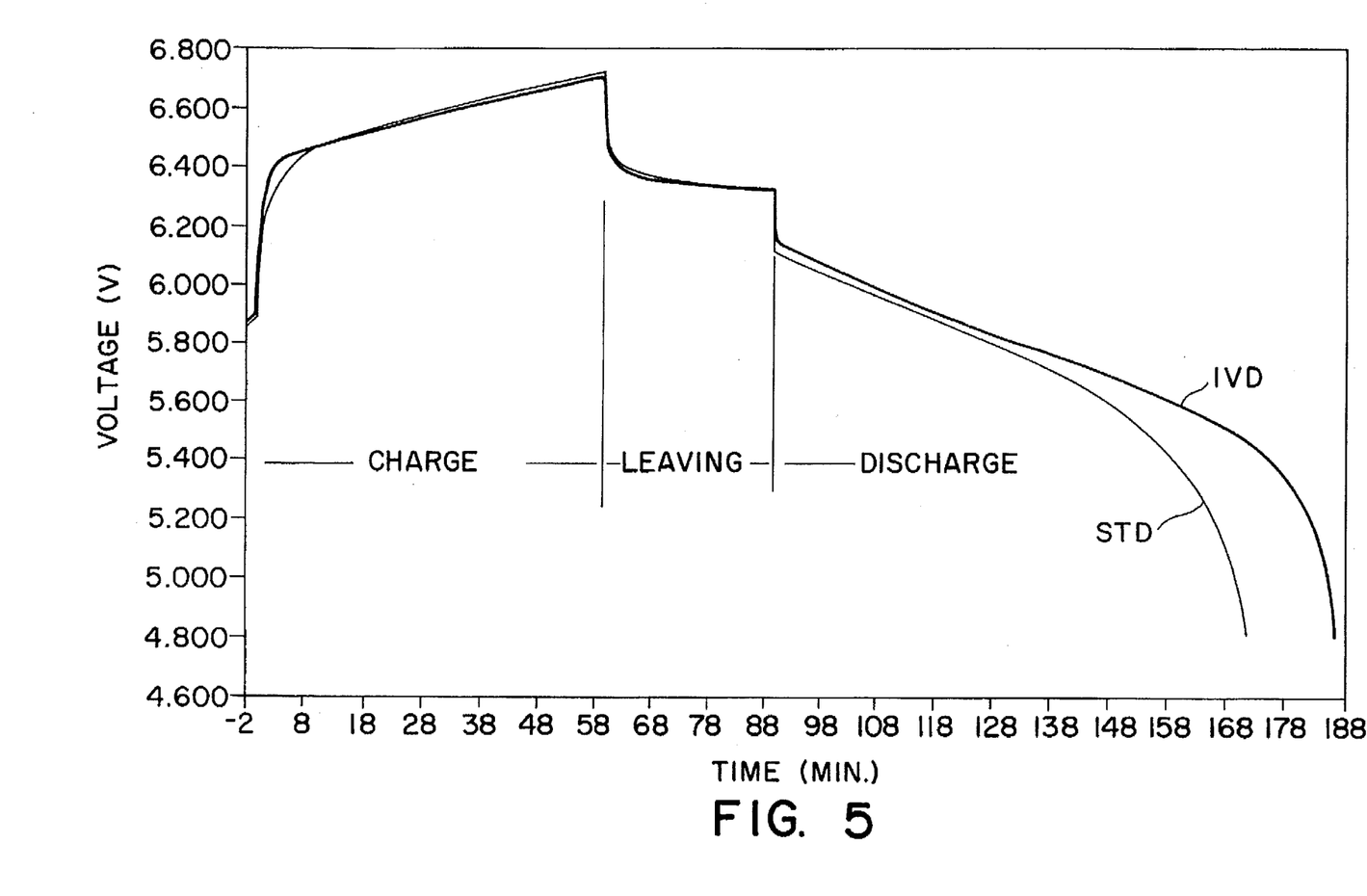
FIGS. 5 to 9 are graphs showing voltage-time curves (discharge curves) at the time of discharge.

Method of test:

A comparison was made between a conventional battery including a dilute sulfuric acid electrolyte solution as it was (STD) and a battery whose electrolyte solution was replaced by 10 vol. % with the carbon suspension obtained by the production method 2 of the example 1 (IVD). The result was shown by a curved line representing a relation between voltage and time in FIG. 5. A discharge time of the battery according to the invention until the voltage is decreased to 4.8 V, that is, a period of time for which the battery of the invention could fulfill a function as a battery, could be prolonged by about 20% more than that of a conventional battery.

EXAMPLE 12

(Concentration of carbon suspension and startability):

About 10 vol. % of an electrolyte solution of a light car battery GS(trademark) 28AH was individually replaced with the carbon suspensions having various concentrations, obtained by the production method 2 of the example 1, and the startability was tested in the respective cases. The test was performed with respect to a 3000 cc diesel engine of Pajero (trademark) manufactured by MITSUBISHI MOTORS CORPORATION. The concentrations of the carbon suspensions were 2, 4, 6 and 8 times higher than the original carbon suspension. The engine could be started without troubles at any concentration.

EXAMPLE 13

Figure 6:
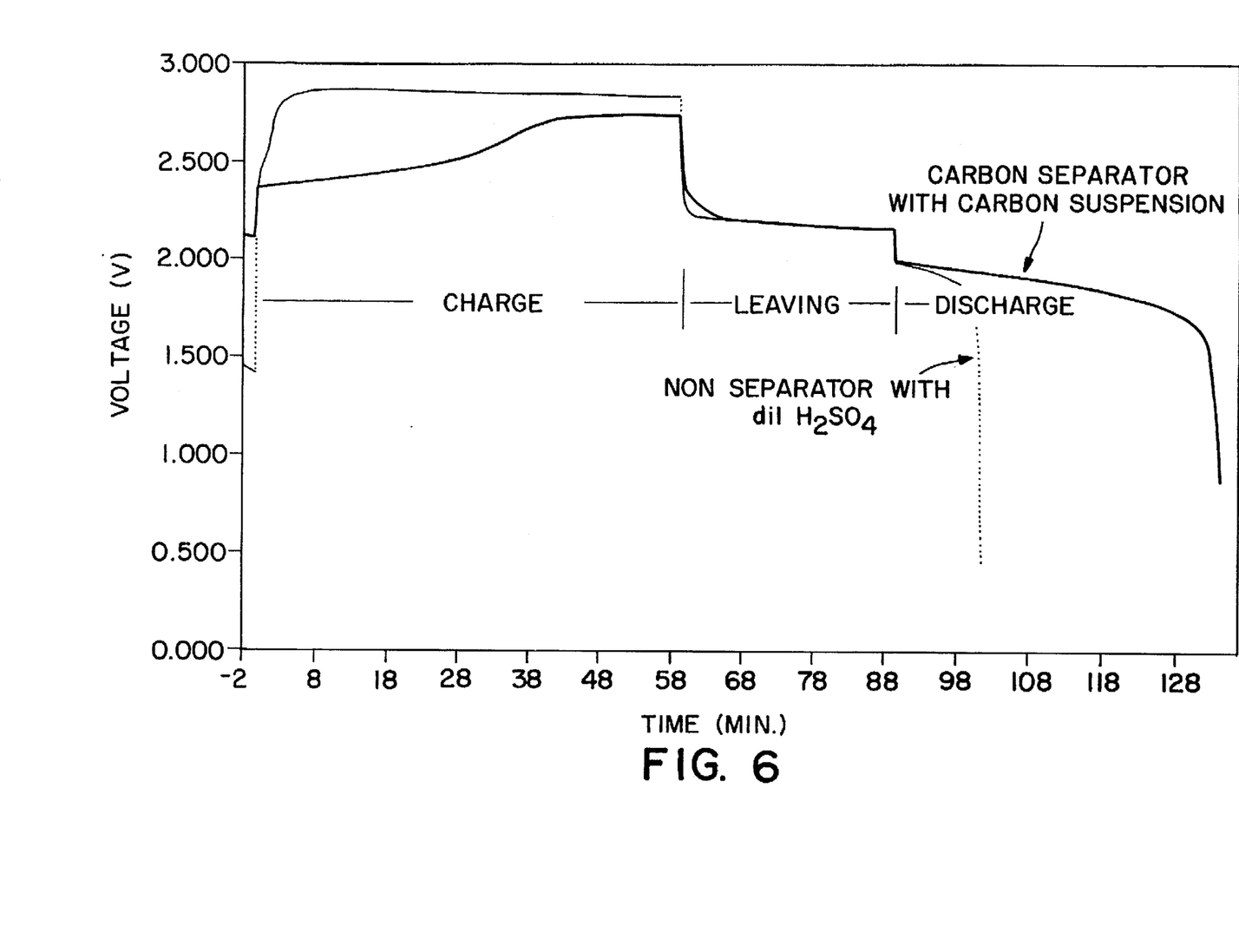

(Capacity of battery at normal temperature):

Selected was a storage battery (model 6N4-2A) including a combination of two cathodes and three anodes per one cell. One cathode and one anode were removed from this battery to have a combination of one cathode and two anodes. A graphite felt of 50 mm (width)×50 mm (length)×2 mm (thickness) was interposed between the cathode and a separator. An electrolyte solution of the above battery was replaced with the carbon suspension made by the production 1 of the embodiment 1 by 5 vol. %, and the battery was charged with currents of 1A for one hour. After the charge, the battery was connected to head lights of 37.5 W for voltage of 1.2 V so as to discharge constant currents (1.2A). A discharge curve (voltage-time curve) at that time is shown in FIG. 6. For comparison, there is shown in FIG. 6 a discharge curve (fine line) in the case where a battery includes a combination of one cathode and two anodes, no graphite felt is interposed between the cathode and anodes, and no carbon suspension is added into the electrolyte solution. As clearly understood from FIG. 6, when using the carbon suspension as well as the carbon felt, an amount of discharge was increased and a discharge voltage was heightened.

EXAMPLE 14

(Capacity of battery at 65° C.):

Brand name of the battery: GS(trademark) 6N4-2A

Method of charge: 1A×1 hour

Method of discharge:

The three above batteries were connected to one another in series to turn on head lights of 37.5 W, thus discharging constant currents (1.2A).

Figure 7:
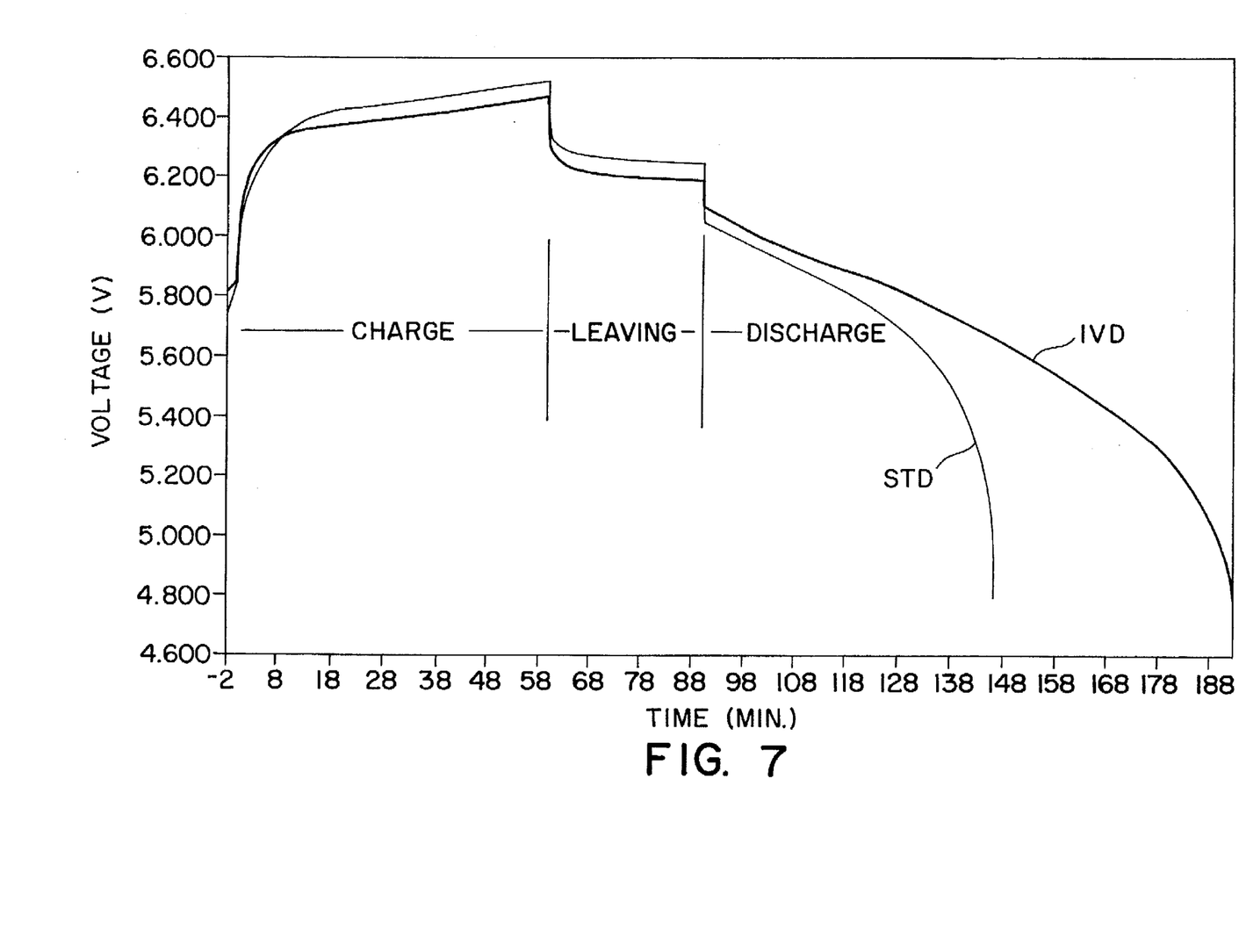

Method of test:

A comparison was made between a conventional battery including a dilute sulfuric acid electrolyte solution as it was (STD) and a battery whose electrolyte solution was replaced by 10 vol. % with the carbon suspension obtained by the production method 2 of the example 1 (IVD). The result was shown by a curved line representing a relation between voltage and time in FIG. 7. A discharge time of the battery according to the invention until the voltage is decreased to 4.8 V, that is, a period of time for which the battery of the invention could fulfill a function as a battery, could be prolonged 1.8 times more than that of the conventional battery. A difference in performance between the battery of the invention and the conventional battery was further increased at a higher temperature.

EXAMPLE 15

(Capacity of battery at −20° C.):

Brand name of the battery: GS(trademark) 6N4-2A

Method of charge: 1A×1 hour

Method of discharge:

The three above batteries were connected to one another in series to turn on head lights of 37.5 W, thus discharging constant currents (1.2A).

Figure 8:
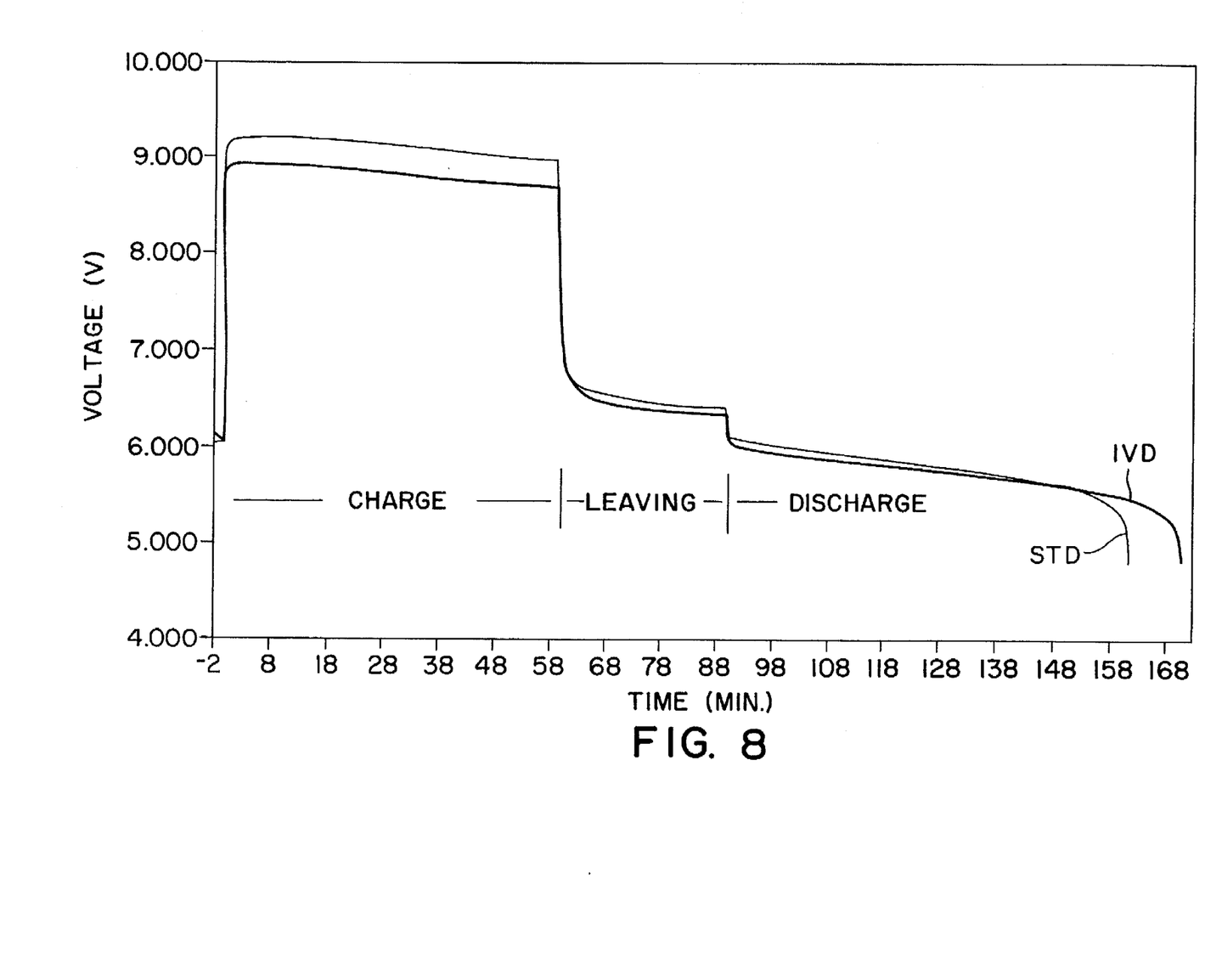

Method of test:

A comparison was made between a conventional battery including a dilute sulfuric acid electrolyte solution as it was (STD) and a battery whose electrolyte solution was replaced by 10 vol. % with the carbon suspension obtained by the production method 2 of the example 1 (IVD). The result was shown by a curved line representing a relation between voltage and time in FIG. 8. A discharge time of the battery according to the invention until the voltage is decreased to 4.8 V, that is, a period of time for which the battery of the invention could fulfill a function as a battery, was substantially the same as that of the conventional battery. However, it was judged from the voltage-time curve at the time of the charge that the battery of the invention could be charged at lower voltage. That is to say, the internal resistance of the battery of the invention was so small that it could be charged easily.

EXAMPLE 16

(Production of electrode):

A cathode of the battery of GS (trademark) 6N4-2A from which an active material of a lead grid was removed, was used, and an anode of the same battery was used as it was.

Figure 9:
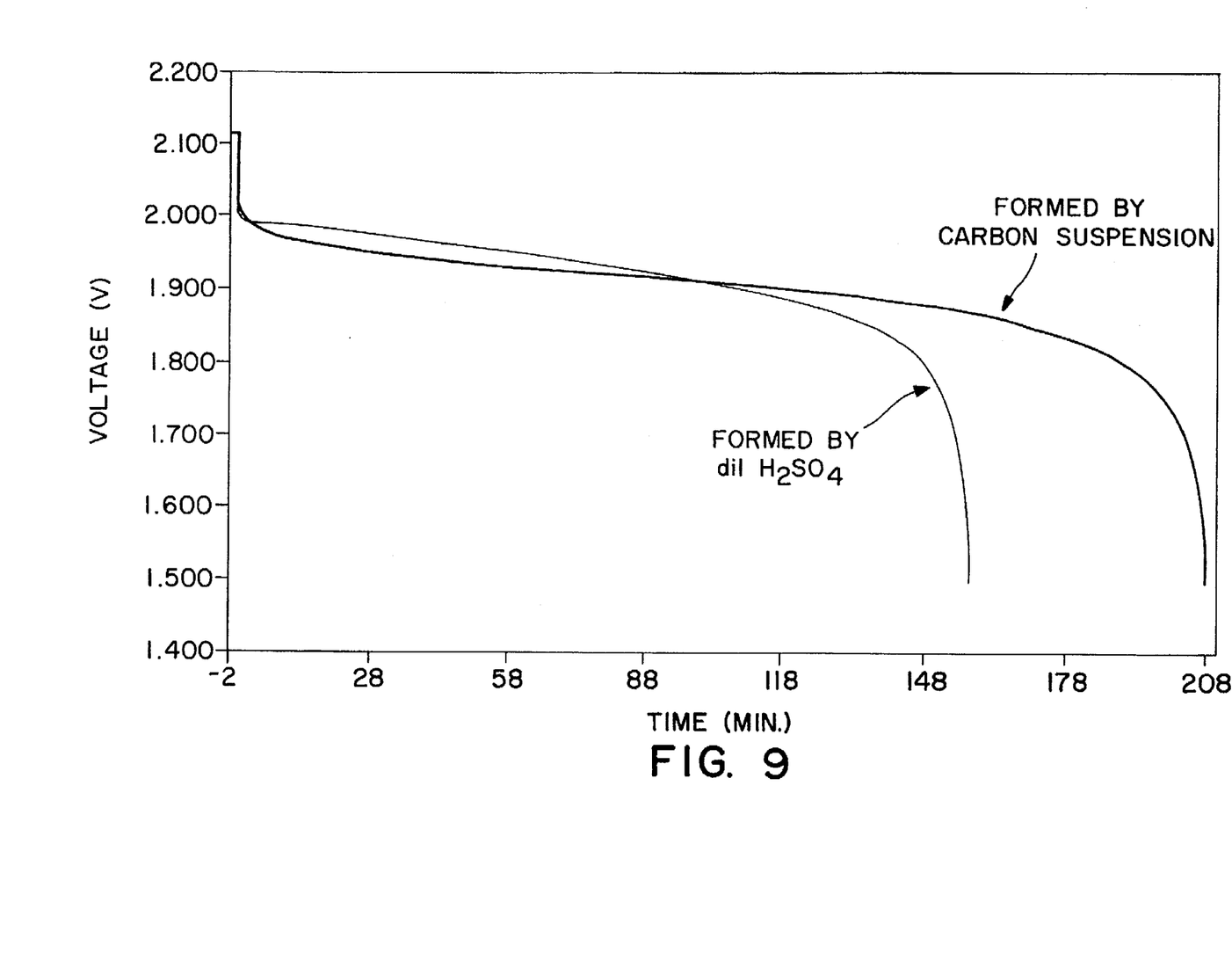

A cathode active material was made by kneading 30 g of lead oxide, 6 g of triplumbic tetroxide and 8 ml of dilute sulfuric acid having a specific gravity of 1.12 into paste-like state. This cathode active material was uniformly filled in the cathode grid and aged for 12 hours at a room temperature. A formation treatment was performed as follows. That is, a nonwoven fabric of glass fiber was interposed and secured between the aged cathode and the anode to thereby insulate them from each other. Then, the cathode, the anode and the insulator were soaked in the carbon powder colloidal solution formed by the production method 1 of the example 1, and direct current voltage was applied between the cathode and the anode to supply currents of 200 mA for twelve hours. The carbon powder was adsorbed on the cathode which had been treated with the formation process. A charge/discharge test was performed as follows. After the formation liquid was extracted from the battery, the dilute sulfuric acid (of the specific gravity of 1.25) was filled therein. The battery was charged with currents of 0.5A for one hours. Thereafter, the battery was made to discharge constant currents (0.4A). A change of voltage at that time was examined. The result is shown in FIG. 9. The adsorption of carbon powder on the cathode by the above method is effective not only for activation of a disused battery, but also for an intermediate process of production of a new cathode of a battery.

What is claimed is:

1. An activated lead-acid battery including an aqueous electrolyte solution, said aqueous electrolyte solution comprising an aqueous carbon suspension by electrolytic oxidation of a carbon positive electrode in water, and said aqueous carbon suspension activating a positive electrode ($PbO_2$) of the lead-acid battery by electrochemical doping when said aqueous carbon suspension is added in said lead-acid battery.

2. An activated lead-acid battery according to claim 1, wherein the aqueous carbon suspension is an aqueous colloidal suspension, and the surfaces of carbon colloid particles are chemically modified with carbonyl groups, carboxyl groups or hydroxyl groups.

3. An activated lead-acid battery for charging operation under a condition that an aqueous carbon suspension obtained by electrolytic oxidation of a carbon positive electrode in water is added in said lead-acid battery vessels, including a $PbO_2$ cathode in contact with a porous carbon sheet.

4. A lead-acid battery according to claim 3, wherein the porous carbon sheet is a carbon fiber fabric or felt.

* * * * *